US010127751B2

(12) United States Patent
Tse

(10) Patent No.: US 10,127,751 B2
(45) Date of Patent: *Nov. 13, 2018

(54) CONTROLLING PHYSICAL ACCESS TO SECURE AREAS VIA CLIENT DEVICES IN A NETWORKED ENVIRONMENT

(71) Applicant: AirWatch LLC, Atlanta, GA (US)

(72) Inventor: Kar Fai Tse, Peachtree Corners, GA (US)

(73) Assignee: AIRWATCH LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/216,236

(22) Filed: Jul. 21, 2016

(65) Prior Publication Data

US 2016/0328895 A1    Nov. 10, 2016

Related U.S. Application Data

(63) Continuation of application No. 14/853,578, filed on Sep. 14, 2015, now Pat. No. 9,438,635, and a continuation of application No. 13/840,156, filed on Mar. 15, 2013, now Pat. No. 9,148,416.

(51) Int. Cl.
*H04L 29/06* (2006.01)
*G07C 9/00* (2006.01)

(52) U.S. Cl.
CPC ..... *G07C 9/00309* (2013.01); *G07C 9/00087* (2013.01); *G07C 9/00571* (2013.01); *H04L 63/08* (2013.01); *H04L 63/10* (2013.01); *H04L 63/20* (2013.01); *G07C 2009/0088* (2013.01); *G07C 2009/00769* (2013.01)

(58) Field of Classification Search
CPC ............... H04L 63/08; G07C 9/00571; G07C 2009/0088
See application file for complete search history.

(56) References Cited

U.S. PATENT DOCUMENTS

| 5,574,786 A | 11/1996 | Dayan et al. |
| 5,987,609 A | 11/1999 | Hasebe |
| 6,021,492 A | 2/2000 | May |
| (Continued) | | |

FOREIGN PATENT DOCUMENTS

| WO | 2008097506 | 8/2008 |
| WO | 2012073265 | 6/2012 |

OTHER PUBLICATIONS

International Search Report dated May 4, 2016 for Application No. 2014235174.
(Continued)

*Primary Examiner* — John B King
(74) *Attorney, Agent, or Firm* — Thomas Horstemeyer, LLP

(57) ABSTRACT

A method is disclosed for providing physical access credentials to a client device. The method may include receiving a request for a physical access credential, where the first request includes at least one user access credential and at least one physical access point identifier. The method may also include determining whether the request should be granted based at least in part on the at least one user access credential. The method may further include, in response to determining that the request should be granted, sending the physical access credential associated with the physical access point.

20 Claims, 4 Drawing Sheets

(56) References Cited

U.S. PATENT DOCUMENTS

| | | |
|---|---|---|
| 6,023,708 A | 2/2000 | Mendez et al. |
| 6,052,785 A | 4/2000 | Lin et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |
| 6,560,772 B1 | 5/2003 | Slinger |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,037,511 B1 | 10/2011 | Lundy et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,225,381 B2 | 7/2012 | Lemke |
| 2002/0013721 A1 | 1/2002 | Dabbiere et al. |
| 2002/0038296 A1 | 3/2002 | Margolus et al. |
| 2003/0110084 A1 | 6/2003 | Eberhard et al. |
| 2003/0204716 A1 | 10/2003 | Rockwood et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0246192 A1 | 11/2005 | Jauffred et al. |
| 2006/0190984 A1 | 8/2006 | Heard et al. |
| 2007/0033397 A1 | 2/2007 | Phillips, II et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0261099 A1 | 11/2007 | Broussard et al. |
| 2007/0288637 A1 | 12/2007 | Layton et al. |
| 2008/0133712 A1 | 6/2008 | Friedman et al. |
| 2008/0134296 A1* | 6/2008 | Amitai ................ H04L 63/102 726/4 |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2009/0036111 A1 | 2/2009 | Danford et al. |
| 2009/0144632 A1 | 6/2009 | Mendez |
| 2009/0183541 A1 | 7/2009 | Sadighi et al. |
| 2009/0198997 A1 | 8/2009 | Yeap et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0271331 A1 | 11/2011 | Adams |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2013/0061307 A1 | 3/2013 | Livne |
| 2013/0152169 A1 | 6/2013 | Stuntebeck |
| 2014/0002236 A1 | 1/2014 | Pineau et al. |

OTHER PUBLICATIONS

Asynchrony Software, Inc., "PDA Defense User Guide", 726,2002.
Belani, Eshwar et al., "The CRISIS Wide Area Security Architecture", 726, 1998.

(56) References Cited

OTHER PUBLICATIONS

Benaloh, Josh et al., "Patient Controlled Encryption: Ensuring Privacy of Electronic Medical Records", 726, Nov. 13, 2009.
Fox, Armando et al., "Security on the Move: Indirect Authentication Using Kerberos", 726, 1996.
Menaria, Pankaj et al., "Security in Mobile Database Systems", 707, 726, Mar. 17, 2011.
Pfitzmann, Andreas et al., "Mobile User Devices and Security Modules: Design for Trustworthiness", 726, Feb. 5, 1996.
Steiner, Jennifer, "Kerberos: An Authentication Service for Open Network Systems", 726, Jan. 12, 1988.
Strunk, John et al., "Self-Securing Storage: Protecting Data in Compromised Systems", Symposium on Operating Systems Design and Implementation, 726, 2000.
Non-Final Office Action cited in U.S. Appl. No. 13/316,073 dated Jan. 18, 2013.
Office Action for U.S. Appl. No. 15/232,280 dated Sep. 21, 2017.

* cited by examiner

CONTROLLING PHYSICAL ACCESS TO SECURE AREAS VIA CLIENT DEVICES IN A NETWORKED ENVIRONMENT

CROSS-REFERENCE TO RELATED APPLICATION

This application is a continuation of and claims the benefit of U.S. patent application Ser. No. 14/853,578, entitled "CONTROLLING PHYSICAL ACCESS TO SECURE AREAS VIA CLIENT DEVICES IN A NETWORKED ENVIRONMENT," filed Sep. 14, 2015, which is a continuation of and claims the benefit of U.S. patent application Ser. No. 13/840,156, entitled "CONTROLLING PHYSICAL ACCESS TO SECURE AREAS VIA CLIENT DEVICES IN A NETWORKED ENVIRONMENT," filed Mar. 25, 2013, both of which are hereby incorporated by reference herein in their entirety.

BACKGROUND

Controlling physical access to buildings, rooms, secured outdoor areas, and storage containers is critical to ensure that only authenticated and authorized users gain access to appropriate areas. To date, this has typically been accomplished by utilizing traditional lock and key mechanisms, radio frequency identification (RFID) readers and fobs, and human monitored access/check points. These methods are either passive, unable to address changing conditions which may impact authorization of various individuals to access certain areas, and/or require human-labor intensive solutions (i.e., security guards). Systems and methods are necessary to take advantage of existing resources which can provide low cost means of authorizing physical access for individuals and dynamically changing the bounds of such authorization depending on relevant conditions pertaining thereto.

BRIEF DESCRIPTION

In some embodiments, a computer-readable medium encoded with software is provided. When executed, the software may receive a request for a physical access credential, where the first request comprises at least one user access credential and at least one physical access point identifier. The software may also determine whether the request should be granted based at least in part on the at least one user access credential. The software may additionally, in response to determining that the request should be granted, send the physical access credential associated with the physical access point.

In some embodiments a method is provided. The method may include receiving, from a sensor, a device identifier from a client device. The method may also include sending, to a remote server, the device identifier and a security identifier associated with a physical lock actuator. The method may further include in response to sending the device identifier and the security identifier, receiving an unlock instruction from the remote server. The method may additionally include, in response to receiving the unlock instruction, actuating the physical lock actuator.

In some embodiments an apparatus is provided. The apparatus may include a communication system configured to recognize the presence of a wireless signal. In response to recognizing the presence of a wireless signal, the communication system may also be configured to transmit a request for at least one physical access credential associated with the wireless signal, wherein the request includes a user access credential. The communication system may further be configured to receive the at least one physical access credential associated with an area where the wireless signal is present. The apparatus may also include a transceiver configured to send at least one physical access credential to a physical access point to actuate a physical lock actuator.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Figure 1:
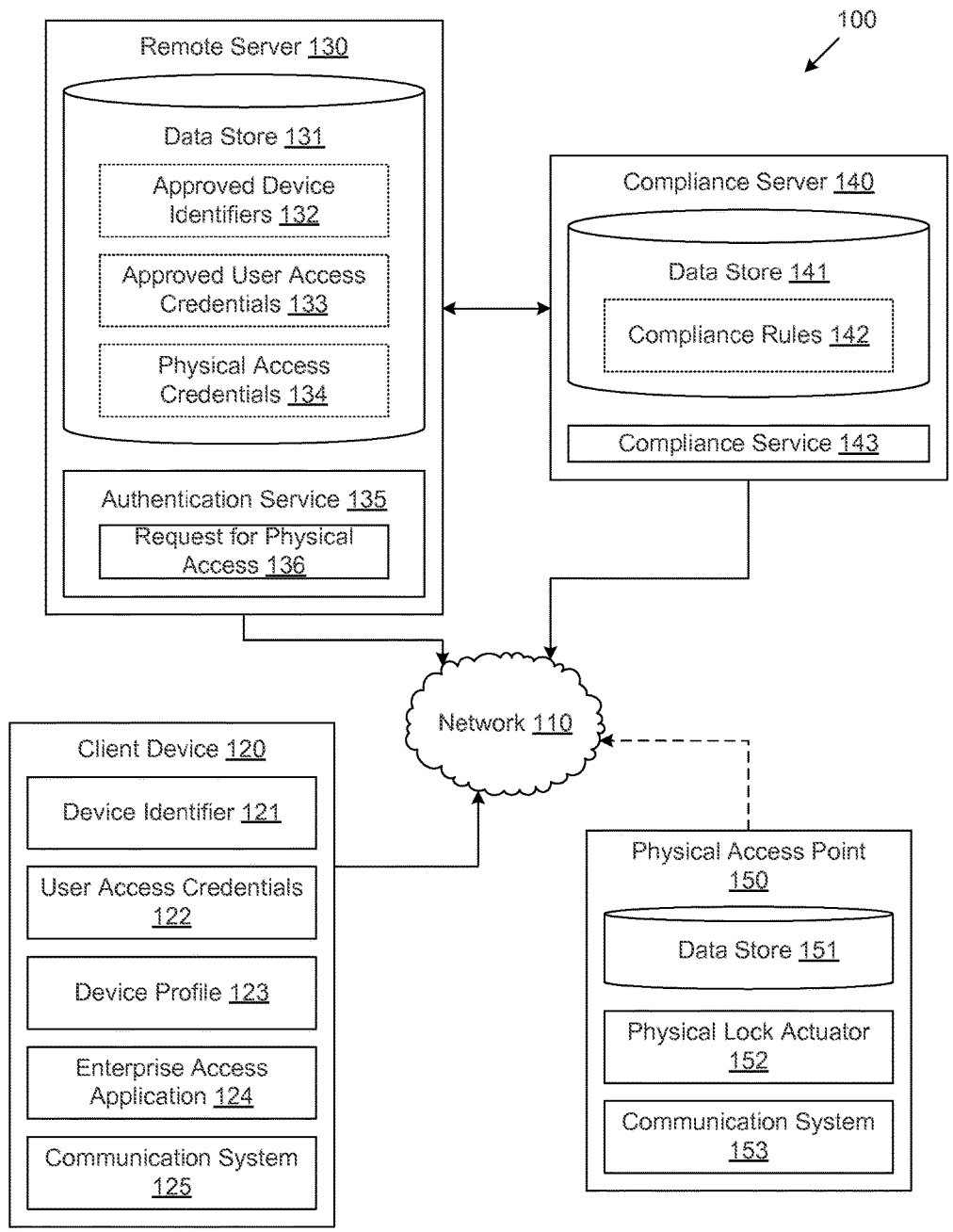
FIG. 1 is a block diagram of a networked environment according to certain example embodiments.

Disclosed are various embodiments for systems and methods for providing a physical access credential to a client device from a remote server, where the physical access credential enables physical access to a secure physical area. An example system comprises a remote server, a client device, a compliance server, and a physical access point, where the remote server performs functionality for receiving requests for physical access credentials, and authorizing and distributing physical access credentials in response to such requests. In some embodiments, the remote server may receive, from a client device, a request for a physical access credential. The request may include a device identifier and/or a user access credential. The remote server may determine whether the request should be granted based at least in part on the device identifier and/or the user access credential being approved device identifiers and/or user access credentials. In some embodiments, the authentication service may authenticate the user operating the client device without also authenticating the client device, or in some embodiments, merely authenticate the device, and not the user. In some embodiments, the authentication service may authenticate that the particular pairing of the device identifier and user access credential is an approved pairing.

The remote server may then identify a physical access credential associated with the approved device identifier and user access credential pairing, the user access credential, and/or the device identifier, based at least in part on a determination that the request should be granted. In some embodiments, the remote server may consult a compliance server to determine if any compliance rules are applicable to the request and/or identified physical access credential. The remote server may check the physical access credential and/or the request, including possibly client device profile information included in such request, against these compliance rules.

Upon authorization and/or favorable comparison to the compliance rules, if applicable, the remote server may then send, to the client device, the identified physical access credential. A user may then present the client device to a physical access point, which includes for example a near field communication device to communicate with the client device. The physical access point and the client device may communicate to establish that the user of the client device is authorized to physical access to the area beyond the physical access point. The physical access point may or may not also communicate with the remote server to receive instructions on which physical access credentials will be accepted, and/or to verify any specific attempt to access by a client device. Once it is determined that physical access is permitted, the physical access point may actuate a mechanical device to unlock a building, location, door, gate, drawer, filing cabinet, storage unit, cabinet, and/or the like.

The remote server may store a log of all granted and denied requests for physical access credentials, all granted physical access credentials, all expired and/or revoked physical access credentials, and/or all uses physical access credentials to obtain entry/access to a physical access point. Any contents of these items may also be stored, and the information may be obtained from the remote server itself, the client device, and/or the physical access point before, during, and/or after such information is generated, received, and/or sent by said system/subsystem.

FIG. 1 illustrates a networked environment 100 according to various embodiments. The networked environment 100 includes a network 110, a client device 120, a remote server 130, a compliance server 140, and a physical access point 150. The network 110 includes, for example any type of wireless network such as a wireless local area network (WLAN), a wireless wide area network (WWAN), and/or any other type of wireless network now known and/or later developed. Additionally, the network 110 includes the Internet, intranets, extranets, microwave networks, satellite communications, cellular systems, PCS, infrared communications, global area networks, and/or other suitable networks, etc., and/or any combination of two or more such networks. Embodiments consistent with this disclosure are described below in connection with WWANs (as illustrated in FIG. 1); however, it should be understood that embodiments described herein may be used to advantage in any type of wireless network.

In some embodiments, the network 110 facilitates the transport of data between at least one client device, such as client device 120, the remote server 130, the compliance server 140, and the physical access point 150. Client devices may include a laptop computer, a personal digital assistant, a cellular telephone, a set-top device, music players, web pads, tablet computer systems, game consoles, and/or other devices with like capability. Client device 120 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, NewCard, Cardbus, a modem, a wireless radio transceiver (including an RFID transceiver), and/or the like. Additionally, the client device 120 may include a processor for executing applications and/or services, and a memory accessible by the processor to store data and other information. The client device 120 is operable to communicate wirelessly with the remote server 130 and the physical access point 150 with the aid of the wireless network connectivity component.

Additionally, the client device 120 may store in memory a device identifier 121, user access credentials 122, a device profile 123, and potentially other data. In some embodiments, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the client device 120. For instance, the device profile 123 may include hardware specifications of the client device 120, version information of various software installed on the client device 120, and/or any other hardware/software attributes. Additionally, the device profile 123 may also include data indicating a date of last virus scan, a date of last access by IT, a date of last tune-up by IT, and/or any other data indicating a date of last device check.

The client device 120 may further be configured to execute various applications such as an "enterprise access application" 124. The enterprise access application 124 may be executed to transmit a request for a physical access credential. One such credentials are received, they may be stored on the client device 120 for later reference and/or transmission, possible via communication system 125. Communication system 125 may be the same or different than the wireless network connectivity component previously discussed, include the same or different communication abilities, and may at least be specifically able to communicate with physical access points 150, discussed below.

The client device 120 may also be configured to execute other applications such as, for example, browser applications, email applications, instant message applications, word processing applications, spreadsheet applications, database applications, and/or other applications. For instance, a browser and/or word processing application may be executed in the client device 120, for example, to access and render network pages, such as web pages, documents, and/or other network content served up by remote server 130, the compliance server 140, and/or any other computing system.

The remote server 130 and the compliance server 140 can each be implemented as, for example, a server computer and/or any other system capable of providing computing capability. Further, the remote server 130, compliance server 140, and any other system described herein may be configured with logic for performing the methods described in this disclosure. Although one remote server 130 and one compliance server 140 are depicted in FIG. 1, certain embodiments of the networked environment 100 include more than one remote server 130 and/or compliance server 140. At least one of the servers may be employed and arranged, for example, in at least one server bank, computer bank, and/or other arrangements. For example, the server computers together may include a cloud computing resource, a grid computing resource, and/or any other distributed computing arrangement. Such server computers may be located in a single installation and/or may be distributed among many different geographical locations. For purposes of convenience, the remote server 130 and the compliance server 140 are each referred to herein in the singular.

Various applications and/or other functionality may be executed in the remote server 130 and the compliance server 140, respectively, according to certain embodiments. Also, various data is stored in a data store 131 that is part of and/or otherwise accessible to the remote server 130 and/or a data store 141 that is part of and/or otherwise accessible to the compliance server 140. The data stored in each of the data stores 131 and 141, for example, may be accessed, modified, removed, and/or otherwise manipulated in association with the operation of the applications and/or functional entities described herein.

The components executed in the remote server 130 include a authentication service 135, and may include other applications, services, processes, systems, engines, and/or functionality not discussed in detail herein. As used herein, the term "authentication service" is meant to generally refer to computer-executable instructions for performing the functionality described herein for authorizing and distributing physical access credentials 136. The authentication service 135 is executed to receive a request for physical access 136 from an enterprise access application 124 executed on a client device 120 and to determine whether to grant or deny the request 136. Upon determining to grant the request 136, the authentication service 135 may then send physical access credentials 134, as will be described.

The data stored in the data store 131 of the remote server 130 may include, for example, approved device identifiers 132, approved user access credentials 133, physical access credentials 134, and potentially other data. The approved device identifiers 132 represents a listing of device identifiers 121 that have been preapproved for potentially accessing physical access credentials 134, which will entitle holders of client devices 120 to physical access at physical access points 150. The approved device identifiers 132 may have been previously provided to the remote server 130 by a system administrator and/or the like. The approved user access credentials 133 represents a listing of user access credentials 122 that have been pre-approved for potentially accessing physical access credentials 134, which will entitle them to physical access at physical access points 150.

The components executed in the compliance server 140 include a compliance service 143, and may include other applications, services, processes, systems, engines, and/or functionality not discussed in detail herein. As used herein, the term "compliance service" is meant to generally refer to computer-executable instructions for performing the functionality described herein for authorizing the device characteristics of another device, such as a client device 120. The compliance service 143 is executed to determine whether the device characteristics of the client device 120 comply with the compliance rules 142 that are stored in the data store 141. For instance, the compliance service 143 may identify the device characteristics from the device profile 123 of each client device 120. Additionally, the compliance rules 142 represents a listing of hardware restrictions, software restrictions, and/or mobile device management restrictions that need to be satisfied by the client device 120 for use of physical access credentials 134.

In some embodiments, hardware restrictions included in the compliance rules 142 may comprise restrictions regarding use of specific client devices 120 and specific client device features, such as, for instance, cameras, Bluetooth, IRDA, tethering, external storage, a mobile access point, and/or other hardware restrictions. Software restrictions included in the compliance rules 142 may comprise restrictions regarding the use of specific client device operating systems and/or other applications 125, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a client device 120 satisfy at least one of the restrictions enumerated in the compliance rules 142. For example, the compliance service 143 may determine that a client device 120 that has a camera, Bluetooth capability, and is executing a specified version of an operating system is compliant with the compliance rules 142. As another example, the compliance service 143 may determine that a client device 120 that is associated with an external storage unit and has screen capture functionality enabled is not compliant with the compliance rules 142. All of these restrictions discussed above may affect whether the client device 120 is entitled to use a given physical access credential 134. In some embodiments, however, the compliance service 143 may not be used and physical access authorization may be determined solely based on approved user access credentials 133 and/or approved device identifiers 132.

A user operating a client device 120 may wish to receive at least one physical access credential 134 so that the user may physically access a building, location, door, gate, drawer, filing cabinet, storage unit, cabinet, etc. In some embodiments, the user may interact with an input device to manipulate a network page displayed by a locally executed application, such as a browser application, to generate the request for physical access 136. In some embodiments, the user may manipulate a user interface generated by a locally executed application to generate the request 136. In either case, the user may provide login information and/or the application may automatically retrieve the login information from the memory of the client device 120. Login information may be, for instance, a unique user name, a password, biometric data, and/or other types of user access credentials 122. The application may then communicate the request to the enterprise access application 124, which may generate and transmit the request 136 to the authentication service 135. In some embodiments, the enterprise access application 124 may itself receive the input from the user directly and then transmit the access request 136 to the remote server 130.

Upon receiving the request 136, the authentication service 135 determines whether to grant or deny the request 136. In some embodiments, the authentication service 135 may first authenticate the client device 120 and the user operating the client device 120. To this end, the authentication service 135 determines whether the device identifier 121 associated with the client device 120 matches one of the identifiers listed in the listing of approved identifiers 132. For instance, the device identifier 121 of the client device 120 may be included as part of the request 136 transmitted by the enterprise access application 124. In some embodiments, the authentication service 135 may request the device identifier 121 from the client device 120 in response to receiving the access request 136. Upon identifying and/or receiving the device identifier 121, the authentication service 135 determines whether the device identifier 121 matches one of the approved identifiers 132 stored in the data store 131. In some embodiments, the authentication service 135 may authenticate the client device 120 dynamically by determining whether the device identifier 121 is within a predetermined range of approved device identifiers 132. In some embodiments, the authentication service 135 may authenticate the client device 120 dynamically by performing an algorithm on the device identifier 121.

Additionally, the authentication service 135 may also authenticate the user operating the client device 120 by determining whether the user access credentials 122 associated with the user match one of the credentials in the listing of approved user access credentials 133. For instance, the user access credentials 122 associated with the user on the client device 120 may be included as part of the access request 136 transmitted by the enterprise access application 124. In some embodiments, the authentication service 135 may request the user access credentials 122 from the client device 120 in response to receiving the access request 136. Upon identifying and/or requesting the user access credentials 122, the authentication service 135 may determine whether the user access credentials 122 matches one of the approved user access credentials 133 stored in the data store 131. In some embodiments, the authentication service 135 may authenticate the user operating the client device 120 without also authenticating the client device 120. In other words, certain authenticated users may be authorized to gain the requested physical access regardless of what device they used to submit the physical access request 136.

In some embodiments, having authenticated the client device 120 and the user operating the client device 120 as authorized to receive the physical access credential 134, the authentication service 135 communicates with the compliance service 143 to further authorize the client device 120 to receive the physical access credential 134. In some embodiments, the compliance service 143 authorizes the client device 120 by determining whether device characteristics of the client device 120 comply with applicable compliance rules 142. For instance, the compliance service 143 may identify the device characteristics of the client device 120 from the device profile 123. All or part of the device profile 123 may have been provided by the client device 120 in conjunction with the request 136 and/or may be subsequently requested from the client device 120 by the authentication service 135 and/or the compliance service 143. The compliance service 143 then analyzes the device characteristics to determine whether the software restrictions, hardware restrictions, and/or device management restrictions defined in the compliance rules 142 are satisfied and returns the result of the determination to the authentication service 135. In an alternative embodiment, the authentication service 135 may include and perform functionality for determining whether the client device 120 complies with the compliance rules 143.

If the authentication service 135 determines and/or receives a determination that the client device 120 is authorized, the authentication service 135 then associates the client device 120 with at least one physical access credential 134. In some embodiments, the authentication service 135 sends the physical access credentials 134 to the client device 120 and authorizes the client device 120 to use such credentials in connection with accessing physical access points 150. In some embodiments, the authentication service 135 may also send the physical access credentials to physical access point 150.

In some embodiments, the physical access credential 134 may be revoked at any time by the remote server 130. Revocation may occur for any number of reasons, including but not limited to, a change in device profile 123, a change in approved device identifiers 132, a change in approved user access credentials 133, expiration of a defined time period, and/or a request from the user of the client device 120.

In some embodiments, the physical access point 150 is an electro-mechanical device capable of sending and/or receiving information, and in response thereto opening a physical barrier, for example a building, location, door, gate, drawer, filing cabinet, storage unit, cabinet, etc. Depending on the embodiment, the physical access point may or may not be in communication with network 110 and servers and devices connected therewith. In these embodiments, the physical access point may have authorized physical access credentials 134 embedded and/or stored therein, either in a ROM-type storage unit, and/or in a non-networked RAM-type storage unit. A non-networked RAM-type storage unit could be updated locally by direct connection via USB and/or the like, with additional security mechanisms to prevent unwanted tampering/changing of the embedded/stored physical access credentials 134.

The physical access point 150 may include a data store 151 for maintaining data and/or applications which relate to determining whether a client device 120 may be allowed access by the physical access point 150. In some embodiments, the data store 151 may only include a single access code and/or datum that is expected to be matched by any client device 120 providing the same, thereby entitling the client device 120 to access beyond the physical barrier. In some embodiments, the data store 151 may include a plurality of access codes, any of which may be matched by a client device 120 to verify authority to access beyond the physical barrier. The physical access point may have a processor to implement such methods.

The physical access point 150 may also include a physical lock actuator 152, for example, a solenoid and/or other electro-mechanical actuator, which is operable to physically unlock the physical barrier upon command to do so by the physical access point 150. The physical access point may also include a communication system 153 for sending and receiving information with a client device 120 (for example, an RFID transceiver, a wireless radio transceiver, a near field communication device, and/or the like).

Figure 2:
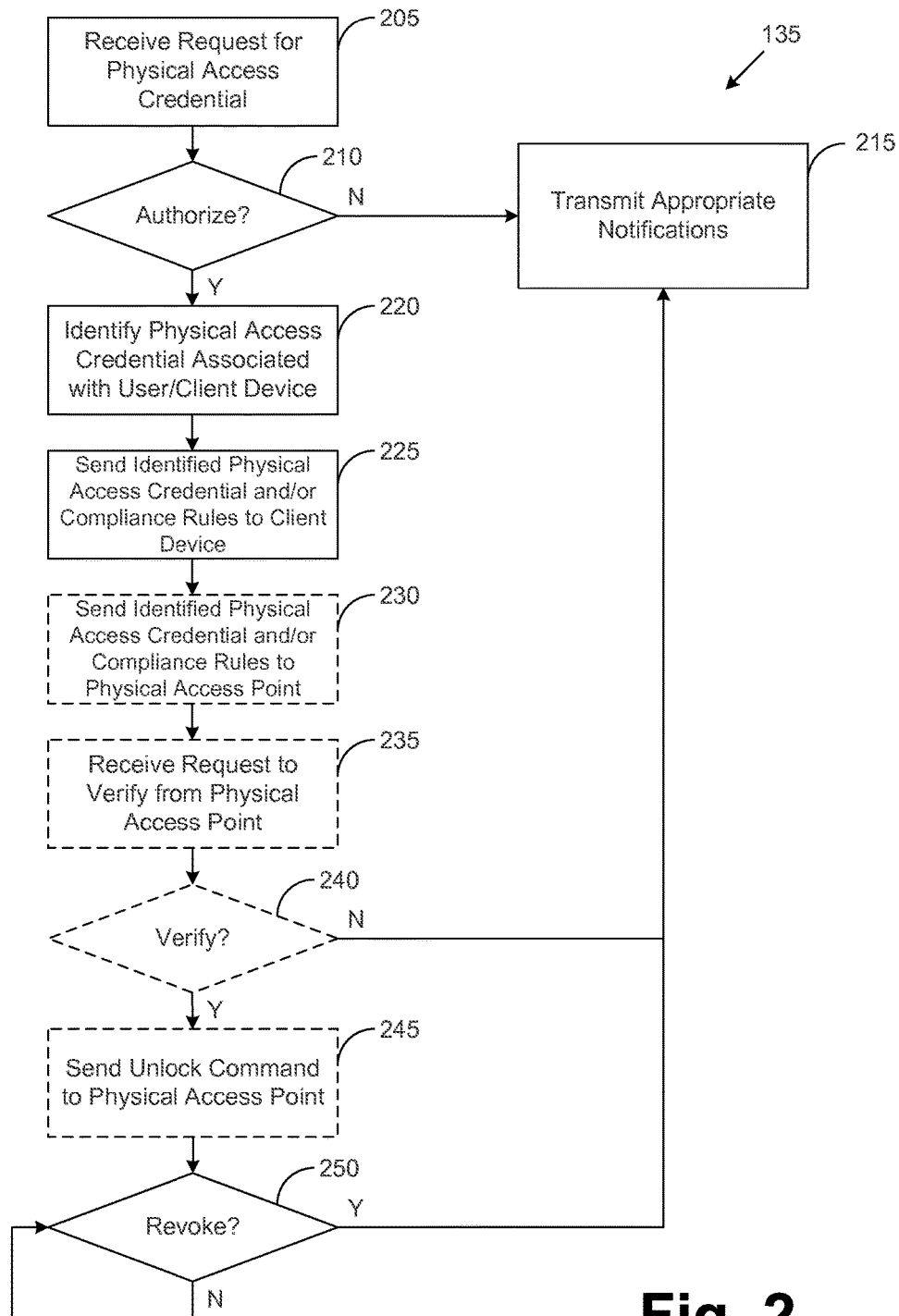
FIG. 2 is a flowchart illustrating example functionality implemented as portions of a authentication service executed by a remote server in the networked environment of FIG. 1.

FIG. 2 is a flowchart illustrating example functionality implemented as portions of a authentication service 135 executed by a remote server 130 in the networked environment 100 of FIG. 1. At block 205, a physical access request 136 is received by the authentication service 135 from a client device 120. At block 210, the authentication service 135 determines whether or not the client device 120 is authorized to receive a physical access credential 134. As described, this authorization decision may at least be based on authentication of a device identifier and/or user access credentials and, in some embodiments, compliance by the user device with applicable compliance rules. If the request 136 is not authorized, then appropriate notifications are transmitted to the client device 120 at block 215. If the request 136 is authorized, then at block 220 the authentication service 135 identifies which physical access credentials are associated with the user and/or client device 120. At block 225, the authentication service 135 sends to the enterprise access application 124 the identified physical access credential 134, as well as any applicable compliance rules 142.

In some embodiments, creating the physical access credential may include creating a hash of a plurality of security identifiers that will be accepted by various physical access points 150 to allow physical access. The remote server 130 may have access to a database and/or list of such security identifiers (also referred to herein as physical access point identifier) and be able to determine which security identifiers correspond to which approved user access credentials 133 and/or approved device identifiers 133. In many embodiments, these security identifiers with represent authentication values stored in a ROM of the physical access points 150. Any suitable compatible hash function may be employed to combine the security identifiers into a hash that may be communicated to the client device 120. The hash may then be decodable by the client device 120 to derive the security identifiers for transmission to the physical access points 150 when access is desired. The client device 120 may transmit all security identifiers in an access attempt, and/or receive a request for a specific identifier from the physical access point 150. In some embodiments, the physical access point 150 may receive the entire un-decoded hash, and decode it independently to verify if the particular security identifier is present in the hash, and that therefore access should be granted. In some embodiments, the hash may be keyed and/or the like, such that an identifier associated with the physical access point 150 may be necessary to decode the hash and retrieve the physical access credential 134 necessary for access. Other data elements may also be employed to decode the hash, including for example, the device identifier 121 and/or the user access credential 122. Communication as necessary between the client device 120 and the physical access point 150 may at least assist in accomplishing decoding of the hash.

Depending on the embodiments, optionally at block 230, the authentication service 135 may also send to the physical access point 150 the identified physical access credential 134, as well as any applicable compliance rules 142. In these embodiments, the physical access point 150 may determine conformance with the compliance rules 142 by receiving the device profile 123 from the client device 120, and/or by transmitting the compliance rules 142 to the client device 120 and requesting the client device 120 confirm conformance to the physical access point 150.

In embodiments where the physical access point 150 consults the remote server 130 to assist in determining whether or not to permit user access, at optional block 235, the authentication service 135 receives a request to determine whether the physical access credential 134 and/or device profile 123 provided by the client device 120 is/are sufficient for access to the particular physical access point 150. This could occur in embodiments where some or all physical access points 150 are in communication with the remote server 130. It could also occur in embodiments where such an interaction between a client device 120 and the physical access point 150 was the first interaction with the client device 120 with the system 100, and could initiate the first request by the client device 120 of a physical access credential 134.

At optional block 240, the authentication service 135 determines whether or not to authorize user/device access at the physical access point. As described, this authorization decision may at least be based on verification that the provided physical access credential 134 is sufficient for access at the physical access point 150 (i.e. where physical access points 150 don't independently store approved physical access credentials 134 for comparison to those provided by client devices 120), compliance by the user device with applicable compliance rules, and/or anticipated delivery of a physical access credential 134 to the client device 120. If the verification request from the physical access point 150 is not authorized, then appropriate notifications are transmitted to the client device 120 and/or the physical access point 150 at block 215. If the verification request is authorized, then at optional block 245, an unlock command is sent to the physical access point 150.

If the remote server 130 determines to revoke the physical access credential previously sent to the client device 120 and/or the physical access point 150, appropriate notifications are transmitted to the client device 120 and/or physical access point 150 at block 215. If not, the remote server 130 awaits further input and/or a change to system parameters which would cause a change in such determination.

In some embodiments, the client device 120 may be able to detect when it has entered a particular area by monitoring for wireless signals. The wireless signals may be, merely by way of example, a public wireless network signal, a private wireless network signal, a near field communication signal, a radio frequency identification (RFID) signal, and/or a cellular phone network signal. In response to detecting such a signal, the wireless device 120 may send a request 136 to the remote server 130 for at least one physical access credential 134 associated with the wireless signal and/or the particular area. In some embodiments, the request 136 may include a user access credential 122, a device identifier 121, and/or a device profile 123. The remote server 130 may determine whether or not to issue physical access credentials 134 based at least in part on the information in the request 136. Which physical access credentials 134 are provided may be based at least in part on what areas the user associated with the request 136 is authorized to physically access, as well as the information in the request 136.

Once physical access credentials 134 are received, a transceiver in the client device 120 may be able to send, either at the direction of the client device 120 or at the request of a physical access point 150, a physical access credential 134 to physical access points 150. In this manner, when a user enters a certain area, characterized by the presence of a wireless network or other signal, physical access credentials 134 can be provided to a user's client device 120 automatically. In some embodiments, upon entry to the area with the wireless network or other signal, the client device 120 can query the user as to whether to request physical access credentials 134. At this point the client device 120 can request additional information necessary to submit such a request 136, including for example, user access credentials 122.

Figure 3:
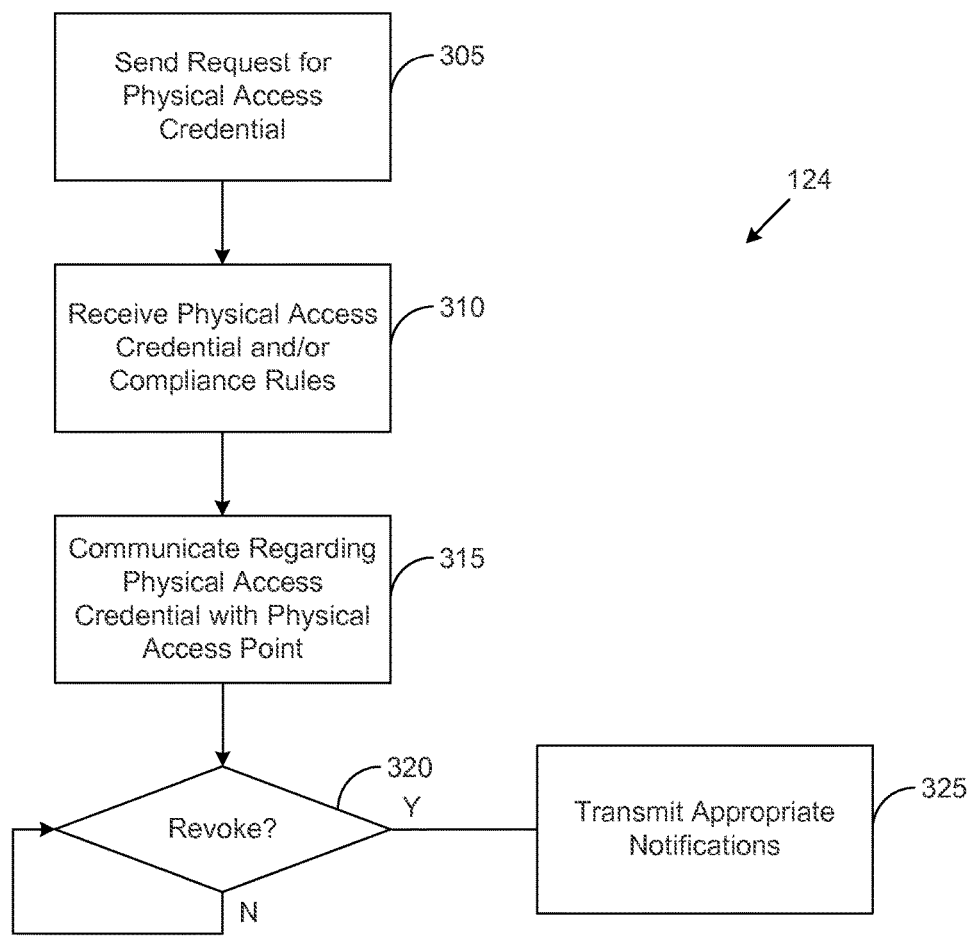
FIG. 3 is a flowchart illustrating example functionality implemented as portions of an enterprise access application executed by a client device in the networked environment of FIG. 1.

FIG. 3 is a flowchart illustrating example functionality implemented as portions of an enterprise access application 124 executed by a client device 120 in the networked environment 100 of FIG. 1. At block 305, the enterprise access application 124 sends a request for physical access 136 to the authentication service 135. The request 136 may include a device identifier 121, user access credentials 122, the device profile 123, and/or other information. At block 310, the enterprise access application 124 receives the physical access credential 134 provided by authentication service 135. Compliance rules 142 that apply to such credentials may also be received from remote server 130 in some embodiments. At block 315, subject to any applicable conditions such as may be specified by the compliance rules 142, if applicable, the enterprise access application 124 communicates with a physical access point 150 regarding the physical access credential 134. This may involve transmitting the physical access credential 134, receiving a request from the physical access point 150 to send verification that the device includes a physical access credential, and/or other back-and-forth communication between the client device 120 and the physical access point 150. In any case, once the physical access point 150 has verified that the physical access credential 134 stored by the client device 120 is authentic, the physical access point activates its physical lock actuator 152 to open the associated barrier to the secure area.

There are multiple methods by which physical access credentials 134 for a differing number of physical access points 150 may be provided to a client device 120. In some embodiments, a single physical access credential 134 may be provided to a requesting client device 120. This single physical access credential 134 may be acceptable to multiple physical access points 150 to provide the desired security for the given user. In some embodiments, potentially, for example, in those embodiments where every physical access point 150 will only accept a particular physical access credential 134, a plurality of physical access credentials 134 may be provided to a requesting client device 120. Then, depending on the particular embodiment, at any given physical access point 150, the client device 120 may either deliver a specific physical access credential 134, or all of its physical access credentials 134. In either situation, the physical access point 150 may prompt delivery of at least one physical access credential 134, and/or the client device 120 may initiate such delivery, potentially at the instruction of a user. In the manner described then, different levels of security authorization may be provided to different users. For example, the chief-executive-officer of a company may have access to all doors in a building, a security guard may have access to most doors in the building, and a receptionist may have access to only a few doors in the building.

At block 320, the enterprise access application 124 determines whether or not to revoke the physical access credential 134 stored on the client device 120. For example, the enterprise access application 124 may determine that a physical access credential 134 is to be revoked based on a compliance rule and/or other limitation associated with the physical access credential 134. As another example, the enterprise access application 124 may be instructed by the authentication service 135 that the physical access credential 134 is to be revoked. If the client device 120 determines to revoke any physical access credentials 134, at block 325 appropriate notifications are transmitted to remote server 130 and/or other systems. If physical access credentials 134 are not to be revoked, the enterprise access application 124 awaits further input and/or change to system parameters which would cause a change in such determination.

Figure 4:
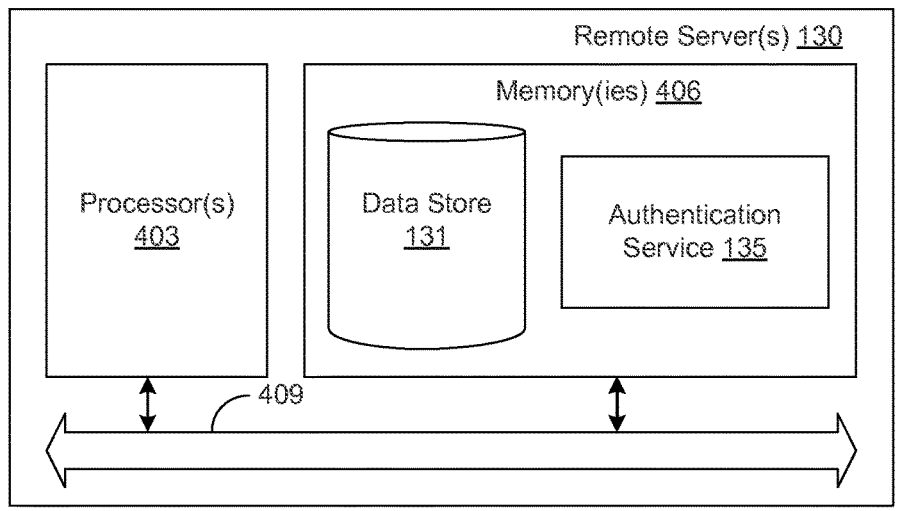
FIG. 4 is a schematic block diagram illustrating a remote server and compliance server employed in the networked environment of FIG. 1.
Figure 4:
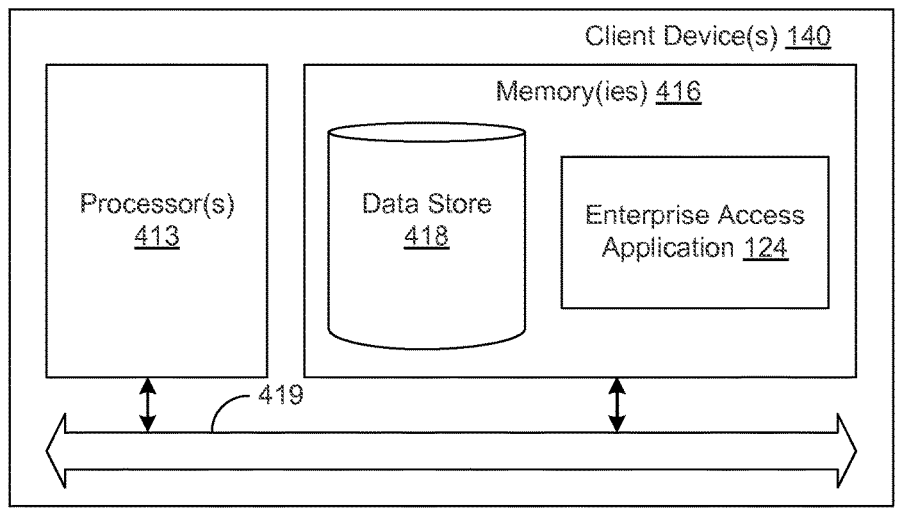

With reference to FIG. 4, shown is a schematic block diagram of the remote server 130 and the client device 140 according to an embodiment of the present disclosure. The remote server 130 includes at least one processor circuit, for example, having a processor 403 and a memory 406, both of which are coupled to a local interface 409. To this end, the remote server 130 may comprise, for example, at least one server computer and/or like device. Similarly, the client device 140 includes at least one processor circuit, for example, having a processor 413 and a memory 416, both of which are coupled to a local interface 419. Additionally, the client device 120 may be in data communication with a display for rendering user interfaces and at least one other I/O device for inputting and outputting data. To this end, the client device 140 may comprise, for example, at least one mobile wireless device, computer, and/or like device. The local interfaces 409 and 419 may comprise, for example, a data bus with an accompanying address/control bus and/or other bus structure as can be appreciated.

Stored in the memories 406 and 416 are both data and several components that are executable by the processors 403 and 413. In particular, stored in the memory 406/416 and executable by the processors 403 and 413 are a authentication service 135, an enterprise access application 124, and potentially other applications. Also stored in the memories 406 and 416 may be a data stores 131 and 418 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, and/or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, and/or source code that may be interpreted by another executable program to generate instructions in a random access portion of the memories 406 and 416 to be executed by the processors 403 and 413, etc. An executable program may be stored in any portion and/or component of the memories 406 and 416 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, and/or between any two of the memories 406 and 416, etc. The local interfaces 409 and 419 may comprise additional systems designed to coordinate this communication, including, for example, performing load balancing. The processors 403 and 413 may be of electrical and/or of some other available construction.

Although the authentication service 135, the enterprise application service 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gates, and/or other components, etc. Such technologies are generally well known by those skilled in the art and, consequently, are not described in detail herein.

The flowcharts of FIGS. 2 and 3 show the functionality and operation of an implementation of portions of the authentication service 135 and the enterprise access application 124, respectively. If embodied in software, each box may represent a module, segment, and/or portion of code that comprises program instructions to implement the specified logical function(s). The program instructions may be embodied in the form of source code that comprises human-readable statements written in a programming language and/or machine code that comprises numerical instructions recognizable by a suitable execution system such as processors 403 and 413 in a computer system and/or other system. The machine code may be converted from the source code, etc. If embodied in hardware, each block may represent a circuit and/or a number of interconnected circuits to implement the specified logical function(s).

Although the flowcharts of FIGS. 2 and 3 show a specific order of execution, it is understood that the order of execution may differ from that which is depicted. For example, the order of execution of two and/or more blocks may be scrambled relative to the order shown. Also, two and/or more blocks shown in succession in FIGS. 2 and 3 may be executed concurrently and/or with partial concurrence. Further, in some embodiments, at least one of the blocks shown in FIGS. 2 and 3 may be skipped and/or omitted. In addition, any number of counters, state variables, warning semaphores, and/or messages might be added to the logical flow described herein, for purposes of enhanced utility, accounting, performance measurement, and/or providing troubleshooting aids, etc. It is understood that all such variations are within the scope of the present disclosure.

Also, any logic and/or application described herein, including the authentication service 135 and the enterprise access application 124, that comprises software and/or code can be embodied in any non-transitory computer-readable medium for use by and/or in connection with an instruction execution system such as, for example, a processors 403 and 413 in a computer system and/or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, and/or maintain the logic and/or application described herein for use by and/or in connection with the instruction execution system. The computer-readable medium can comprise any one of many physical media such as, for example, magnetic, optical, and/or semiconductor media. More specific examples of a suitable computer-readable medium would include, but are not limited to, magnetic tapes, magnetic floppy diskettes, magnetic hard drives, memory cards, solid-state drives, USB flash drives, and/or optical discs. Also, the computer-readable medium may be a random access memory (RAM) including, for example, static random access memory (SRAM) and dynamic random access memory (DRAM), and/or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), and/or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method, comprising:
   identifying, by a client device, a particular physical access point comprising a physical lock actuator;
   identifying, by the client device, at least one authentication credential associated with the client device;
   generating, by the client device, a request to cause the physical lock actuator to be in an unlocked state, the request comprising the at least one authentication credential associated with the client device, the request comprising a hardware restriction, the hardware restriction identifying that a hardware feature of the client device is restricted;
   transmitting, by the client device, the request to a computing device wherein the computing device returns an access credential to the client device, the access credential comprising a hash of at least one security identifier associated with at least one physical access point comprising the particular physical access point, wherein the computing device returns the access credential based on the authentication credential and the hardware restriction; and
   transmitting, by the client device, the access credential to the particular physical access point to actuate the physical lock actuator.

2. The method of claim 1, further comprising:
   identifying, by the client device, a device profile associated with the client device, the device profile comprising a plurality of characteristics describing the client device.

3. The method of claim 2, wherein the request further comprises the device profile associated with the client device.

4. The method of claim 2, wherein the characteristics describing the client device comprise hardware specifications of the client device and the hardware restriction.

5. The method of claim 2, wherein the characteristics describing the client device comprise software specifications of the client device.

6. The method of claim 1, wherein identifying the at least one authentication credential associated with the client device comprises obtaining login information using an application executed by the client device.

7. The method of claim 1, wherein the at least one authentication credential associated with the client device comprises a device identifier associated with the client device.

8. The method of claim 1, wherein the at least one authentication credential associated with the client device comprises a user identifier associated with a user of the client device.

9. A computing system, comprising:
one or more processors; and,
a memory coupled to the one or more processors, the memory storing instructions that, when executed by the one or more processors, cause the computing system to:
identify, by a client device, a particular physical access point comprising a physical lock actuator;
identify, by the client device, at least one authentication credential associated with the client device;
generate, by the client device, a request to cause the physical lock actuator to be in an unlocked state, the request comprising the at least one authentication credential associated with the client device, the request comprising a hardware restriction, the hardware restriction identifying that a hardware feature of the client device is restricted;
transmit, by the client device, the request to a computing device wherein the computing device returns an access credential to the client device, the access credential comprising a hash of at least one security identifier associated with at least one physical access point comprising the particular physical access point, wherein the computing device returns the access credential based on the authentication credential and the hardware restriction; and
transmit, by the client device, the access credential to the particular physical access point to actuate the physical lock actuator.

10. The computing system of claim 9, wherein the computing device comprises the particular physical access point.

11. The computing system of claim 9, wherein the computing device comprises an authentication service, the authentication service being configured to determine whether the client device is authorized to cause the physical lock actuator to be in an unlocked state based at least in part on the at least one authentication credential associated with the client device.

12. The computing system of claim 9, wherein the computing device comprises a compliance service, the compliance service being configured to determine whether the client device is authorized to cause the physical lock actuator to be in an unlocked state based at least in part on whether at least one compliance rule is satisfied by the client device.

13. The computing system of claim 12, wherein the at least one compliance rule requires the hardware restriction.

14. The computing system of claim 12, wherein the at least one compliance rule requires at least one software restriction.

15. The computing system of claim 12, wherein at least one compliance rule comprises at least one mobile device management restriction.

16. A non-transitory computer-readable medium storing instructions that, when executed by one or more processors, cause at least one computing device to:
identify, by a client device, a particular physical access point comprising a physical lock actuator;
identify, by the client device, at least one authentication credential associated with the client device;
generate, by the client device, a request to cause the physical lock actuator to be in an unlocked state, the request comprising the at least one authentication credential associated with the client device, the request comprising a hardware restriction, the hardware restriction identifying that a hardware feature of the client device is restricted;
transmit, by the client device, the request to a computing device wherein the computing device returns an access credential to the client device, the access credential comprising a hash of at least one security identifier associated with at least one physical access point comprising the particular physical access point, wherein the computing device returns the access credential based on the authentication credential and the hardware restriction; and
transmit, by the client device, the access credential to the particular physical access point to actuate the physical lock actuator.

17. The non-transitory computer-readable medium of claim 16, further storing instructions that, when executed by the one or more processors, further cause the at least one computing device to:
receive a request to transmit a device profile associated with the client device to at least one of: an authentication service, a compliance service, or the particular physical access point.

18. The non-transitory computer-readable medium of claim 16, further storing instructions that, when executed by the one or more processors, further cause the at least one computing device to:
identify at least one compliance rule associated with the client device; and,
determine that the client device satisfies the at least one compliance rule associated with the client device based at least in part on a device profile associated with the client device.

19. The non-transitory computer-readable medium of claim 16, wherein the hardware restriction comprises at least one of: a camera restriction, a Bluetooth restriction, an IRDA restriction, a tethering restriction, an external storage restriction, or a mobile access point restriction.

20. The non-transitory computer-readable medium of claim 17, further storing instructions that, when executed by the one or more processors, further cause the at least one computing device to:
transmit the device profile to the physical lock actuator.

* * * * *